United States Patent [19]

Durre et al.

[11] 4,187,091
[45] Feb. 5, 1980

[54] PLEATED PAPER FILTER CARTRIDGE

[75] Inventors: Reynold F. Durre; Richard P. Berven, both of Minneapolis, Minn.

[73] Assignee: Donaldson Company, Inc., Minneapolis, Minn.

[21] Appl. No.: 931,770

[22] Filed: Aug. 7, 1978

Related U.S. Application Data

[63] Continuation of Ser. No. 797,317, May 16, 1977, abandoned.

[51] Int. Cl.² ............................................. B01D 46/00
[52] U.S. Cl. ...................................... 55/499; 55/502; 55/381; 55/521; 210/493 R
[58] Field of Search ............................ 55/302, 379–382, 55/493, 499, 500, 521; 210/493 R

[56] References Cited

U.S. PATENT DOCUMENTS

| 3,144,315 | 8/1964 | Hann | 55/521 |
| 3,320,727 | 5/1967 | Farley et al. | 55/378 |
| 3,422,602 | 1/1969 | Janson | 55/378 |
| 3,631,582 | 1/1972 | Lucas | 55/521 |
| 3,802,169 | 4/1974 | Mugford | 55/521 |
| 3,830,042 | 8/1974 | MacDonnell | 55/379 |
| 4,007,026 | 2/1977 | Groh | 55/302 |

FOREIGN PATENT DOCUMENTS

| 1275496 | 10/1961 | France | 55/497 |
| 880427 | 10/1961 | United Kingdom | 55/521 |

Primary Examiner—Bernard Nozick
Attorney, Agent, or Firm—Merchant, Gould, Smith, Edell, Welter & Schmidt

[57] ABSTRACT

A filter including a resilient frame, a hollow body of pleated paper, and end closures, molded together to make a flexible unitary structure which maintains its shape and has the efficiency characteristics of the paper medium.

17 Claims, 7 Drawing Figures

FIG. 2
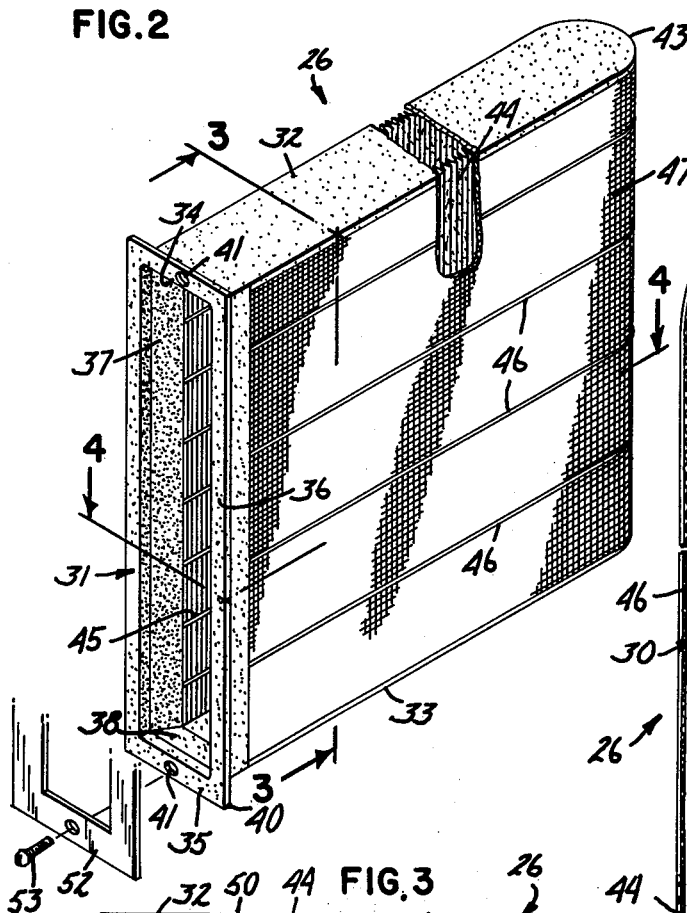
FIG. 3
FIG. 4
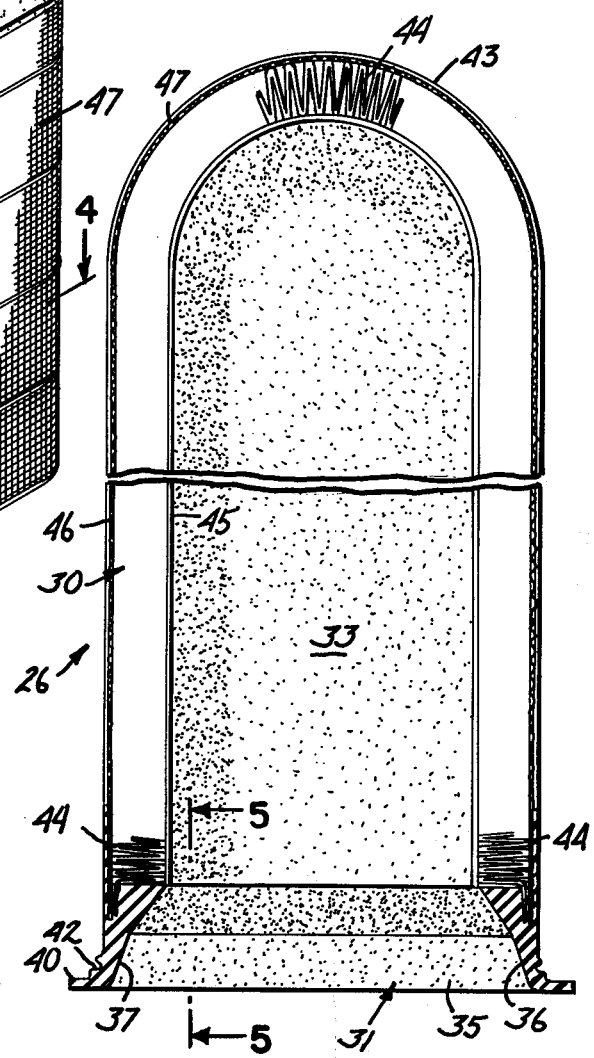
FIG. 5
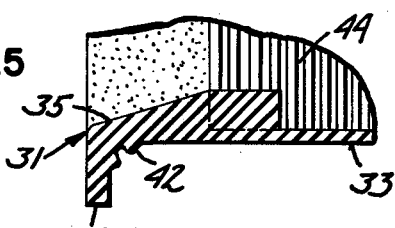
FIG. 6
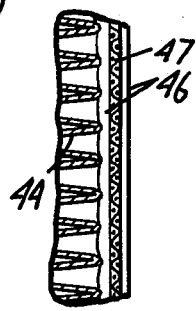

PLEATED PAPER FILTER CARTRIDGE

This is a continuation of application Ser. No. 797,317, filed May 16, 1977 now abandoned.

BACKGROUND OF THE INVENTION

This invention relates to the field of air cleaners, and more particularly to an improved filter for use to improve a known system for cleaning the air admitted to diesel locomotive engines. The system comprises a housing having an outlet for connection to the engine inlet, and a panel with a plurality of rectangular inlet openings, into which bag-shaped "cartridges" of glass-fiber filter fabric are inserted, being secured by clamping an out-turned lips of the bags to the face of the housing. The clamping member includes an open wire skeleton frame or cage for holding the walls of the bag apart to give a maximized working surface and to protect against turbo-surge. The fabric is coated witn an oil adhesive to assist in trapping particulate matter.

While this system has been quite successful, the filter medium is initially of relatively low efficiency, and its efficiency decreases further as the oil adhesive takes up air contaminants. The necessity for the internal cage means that the system must be installed with sufficient space around it to permit removal and replacement of this element, and also results in wear on the inner surface of the bag.

SUMMARY OF THE INVENTION

The present invention comprises a flexible, integral filter which can be distorted for successful insertion into the system housing from spaces shorter than the behind-the-panel length of the filter. It is inherently shape-retaining so that no inner form or skeleton is necessary, and it makes use of pleated paper as a filter medium, which is characterized both by greater initial efficiency than glass-fiber fabric and by increasing filtering efficiency throughout its life. This is accomplished by molding a hollow body of pleated paper integrally with a flexible polyurethane frame and with a pair of flexible polyurethane end closures to give a unit which is quite flexible, particularly as regards bending about axes parallel to the pleats, which are themselves parallel to the longer dimension of the frame.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 2 is a perspective view of my invention, parts being broken away for clarity of illustration;

FIG. 3 is a sectional view in perspective taken along the line 3—3 of FIG. 2;

FIG. 4 is a sectional view taken along the line 4—4 of FIG. 3;

FIG. 5 is a fragmentary detailed sectional view along the line 5—5 of FIG. 4;

FIG. 6 is an enlarged fragmentary detailed sectional view of a portion of the invention; and FIG. 7 schematically shows how my invention may be used in cramped quarters.

DESCRIPTION OF THE PREFERRED EMBODIMENT

Figure 1:
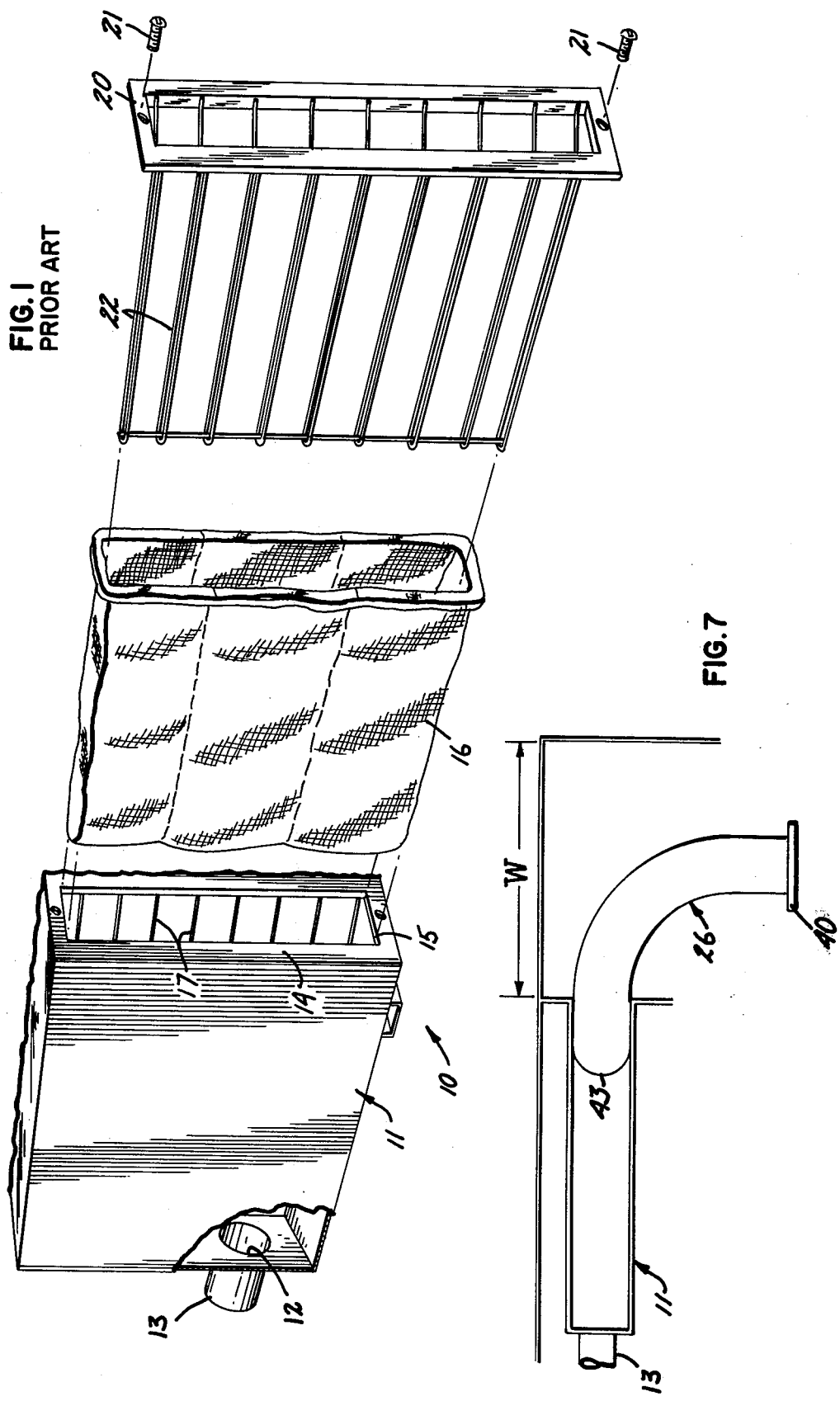
FIG. 1 is an exploded partial view in perspective of a prior art air cleaning system for which our invention comprises an improvement.

An understanding of my invention will be expedited by a brief consideration of the prior art system for which it is designed as an improvement. Here an air cleaner 10 is shown to have an airtight housing 11 with an air outlet opening 12 adapted to be connected by a conduit 13 to the air inlet of a diesel locomotive engine not shown. A front wall or panel 14 of the housing has a plurality of rectangular openings 15, (one of which is shown) the longer dimensions being vertical. A filter "cartridge" or bag 16 is to be inserted bottom-first into each of these openings, being received in a supporting cage 17 of wire carried by the housing. Each bag has an outturned flap to rest against the outside of panel 14 surrounding the opening, against which it is clamped by a frame 20 secured by fasteners 21. Carried by and projecting inwardly from frame 20 is an internal cage or supporting skeleton 22 which enters the bag as the frame is positioned, and thereafter prevents collapse or eversion of the bag, as a result of turbo-surge, for example.

FIG. 2 is a perspective view of our improved filter, shown in more detail in FIGS. 3–6. The filter 26 is made up of a flexible U-shaped body 30, a resilient rectangular generally flat, hollow mounting frame 31, and a pair of resilient end closures 32 and 33. Frame 31 has a pair of opposite short sides 34 and 35 and a pair of opposite long sides 36 and 37, dimensioned to be received in any of the openings 15, and also has at an outer surface a surrounding lip 40 perforated as at 41 to pass mounting fasteners, and configured at 42 to seal against opening 15.

Body 30 extends from the inner surface of side 36, in a direction normal thereto, curves through 180° at 43, and returns parallel to itself to the inner surface of side 37. It is formed of a filter medium of pleated paper 44, the pleats running parallel to sides 36 and 37, and is reinforced along its inner surface by beads 45 of plastic adhesive, and along its outer surface by similar beads 46. The beads are located generally along the intersections, with the folds of the pleats, of planes perpendicular to frame 31. An additional stablizing sheet 47 of reticulated material is secured to the outer folds of pleated paper 44 by beads 46.

The ends of filter 26 comprise closure means 50 and 51 of resilient, impervious material: in one embodiment of the invention frame 31 and closure means 50 and 51 were of resilient highly flexible polyurethane molded together. The ends of body 30 were in this unit molded into sides 37 and 36 of frame 31, and the free edges of sheet 47 and pleated paper 44 were molded into closure means 33, to give an integral unit which was light, flexible, and shape-retaining. The unit is to be secured in housing 11 by a simple metal frame 52 and fasteners 53, and no internal cage or skeleton is required because each pleat of the paper acts as a beam strengthening the structure against collapse: the inner rim of frame 31 can be configured with a taper to facilitate entry into the filter of air to be cleaned.

FIG. 7 shows how our new filter is advantageous, and should be compared with FIG. 1. Note that in FIG. 1 space must be available in front of panel 14 at least equal in width to the depth of skeleton 22, to permit removal of the latter prior to the removal of cartridge 16. FIG. 7 shows that our filter is sufficiently flexible that it can be bent at substantially 90° for insertion into the housing, resuming its original shape thereafter, so that the working space W needed in front of the panel is proportionately lessened.

From the foregoing it will be evident that we have invented a new and improved filter, and a new air cleaning system including that filter. The filter is light, flexible, and initially efficient, and its efficiency increases with use of the filter.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In an air cleaning system comprising a housing having an air outlet opening, at least one rectangular air inlet opening, means causing air flow from said inlet opening to said outlet opening, and a filter in said inlet opening for passing air and retaining particulate air borne matter, the improvement wherein said filter comprises a resilient frame adapted for securement in said inlet opening, a flexible body of pleated filter paper formed into a substantially U-shaped configuration, the body extending from a first side of one surface of said frame to a second, opposite side thereof at said first surface and molded into said sides, with said pleats extending generally parallel to said first and second sides of said frame, and resilient and flexible flat closure members resilient in their own planes and in molded relation to said first surface of said frame at the other sides thereof and to the opposite edges of said pleats.

2. In a filter:

a resilient, hollow, generally flat, rectangular frame having opposite surfaces and first and second pairs of spaced opposite parallel sides;

a flexible body of pleated filter paper, having a U-shaped cross section transverse to the pleats, so as to define concave and convex faces, said body extending from a first end at a first side of one surface of said frame in a direction perpendicular to said face, then curving through 180°, and then returning parallel to itself to a second end at a second side of said frame opposite said first side at said first surface, the pleats of said body extending generally parallel to said first and second sides of said frame;

means securing the first and second ends of said body in said first and second sides of said frame; and resilient and flexible flat closure members, resilient in their own planes, secured to the other sides of said frame and to the opposite edges of the pleats of said body.

3. A structure according to claim 2 and further comprising means extending along said convex and concave faces of said body from said first side of said frame to said second side thereof, for reinforcing said body and stabilizing said pleats.

4. A structure according to claim 2 and further comprising means extending along at least one face of said body, from said first end to said second end thereof, for reinforcing said body and stabilizing said pleats.

5. A filter according to claim 2 in which said closure members and the ends of said body are molded into said sides of said frame, and the edges of said pleats are molded into said closure member, to result in an integral resilient filter.

6. A structure according to claim 2 and further comprising means extending along said convex face of said body, from said first side of said frame to said second side thereof, for reinforcing said body and stabilizing said pleats.

7. A structure according to claim 6 in which said means extending along said convex face of said body comprises a sheet of reticulated material secured to said body along all the edges of said sheet and along mutually spaced lines extending on the convex face of said body from said first side of said frame to said second side thereof, and generally aligned with said closure means.

8. A resilient filter adapted for insertion into a rectangular inlet opening of a filter housing, comprising, in combination:

a resilient, hollow, generally flat rectangular frame having opposite surfaces and first and second pairs of spaced, opposite, generally parallel sides adapted to enter said inlet opening, and having a lip to engage the wall of said housing around said opening;

a flexible body of pleated filter paper, having a U-shaped cross section transverse to the pleats so as to define concave and convex faces, said body extending from a first end at a first side of one surface of said frame, in a direction perpendicular to said face and away from said lip, then curving through 180°, and then returning parallel to itself to a second end at a second side of said frame opposite said first side at said first surface, the pleats of said body extending generally parallel to said first and second sides of said frame;

further means extending along the surfaces of said body from said first side of said frame to said second side thereof for reinforcing said body and stabilizing said pleats, said further means including at least one sheet of reticulated flexible material secured to said body along mutually spaced lines extending from said first side of said frame to said second side thereof and generally perpendicular to said pleats;

means securing the ends of said body and said sheet in said first and second sides of said frame;

and resilient and flexible flat closure members resilient in their own planes and in molded relation to the other sides of said frame and to the opposite edges of said sheet and of the pleats of said body.

9. A replacement filter for use in a filter housing having an elongated rectangular opening through which the filter is inserted, comprising:

a supporting frame of generally rectangular configuration dimensioned to overlie the rectangular housing opening and defining front and back faces, the frame comprising a first pair of elongated sides spaced apart to define an elongated opening there-between, and a second pair of shorter sides connecting the ends of the first pair;

a filter body of pleated filter material, the body being flexible about the pleats and formed into a substantially U-shaped configuration that defines first and second adjacent ends and first and second substantially U-shaped edges, the filter body having a dimension extending in the direction of the pleats that approximates the length of the elongated frame opening and a predetermined insertion dimension;

means for sealably securing the first and second filter body ends to the first and second frame sides, respectively, so that the U-shaped filter body projects rearwardly from the back face of the supporting frame over said insertion dimension;

and a resiliently flexible closure member sealably secured to each of said second pair of shorter sides and to the associated U-shaped filter body edge, so that air entering the frame opening must pass through the filter body and vice versa, the filter body and closure members in their assembled state being together flexible between a first configuration in which the filter body is substantially straight over its insertion dimension and a second configuration in which the filter body is substantially curved over the insertion dimension with said pleats always remaining substantially mutually parallel, whereby the filter may be inserted through the rectangular housing opening where the available space in front of the housing is less than the insertion dimension of the filter body.

10. The replacement filter defined by claim 9, wherein the frame is formed from resilient, flexible material.

11. The replacement filter defined by claim 9, which further comprises a stabilizing sheet of reticulated material secured to the outer surface of the filter body.

12. The replacement filter defined by claim 9, wherein the filter body defines an inner concave surface and an outer convex surface, and further comprising means secured to the inner and outer surfaces for reinforcing the filter body.

13. The replacement filter defined by claim 12, wherein said reinforcing means comprises a plurality of beads of plastic adhesive extending along said inner and outer surfaces transversely of said pleats and secured to the folds thereof.

14. The replacement filter defined by claim 9, wherein the closure members are fluid impervious.

15. The replacement filter defined by claim 14, wherein the closure members are integrally molded with said supporting frame.

16. The replacement filter defined by claim 15, wherein the closure members and frame are formed from the same material.

17. The replacement filter defined by claim 16, wherein the material of said closure members and frame is polyurethane.

* * * * *